JOHN N. McLEAN & JOSEPH BENNER.
Improvement in Brick-Machines.
No. 126,728. Patented May 14, 1872.
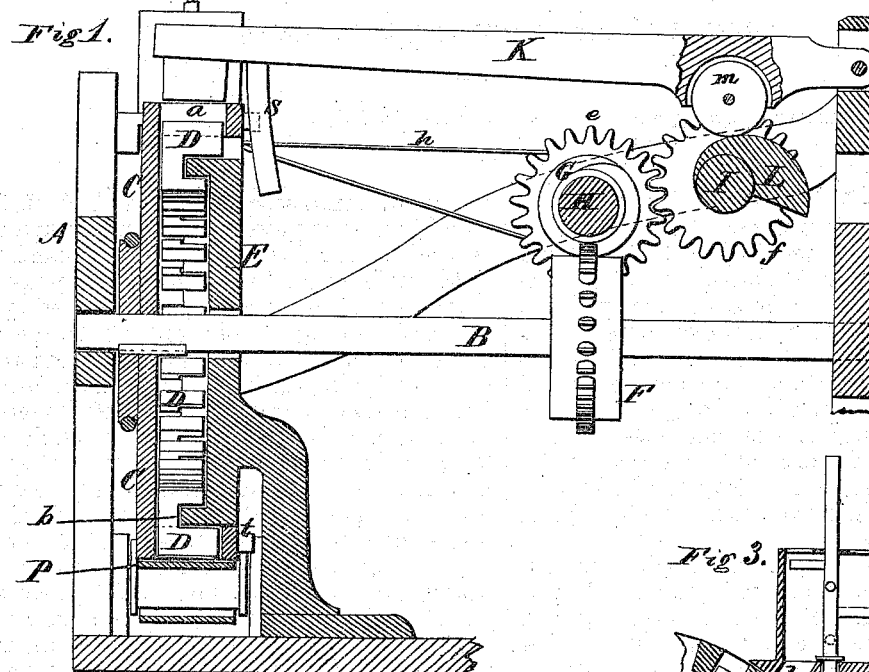
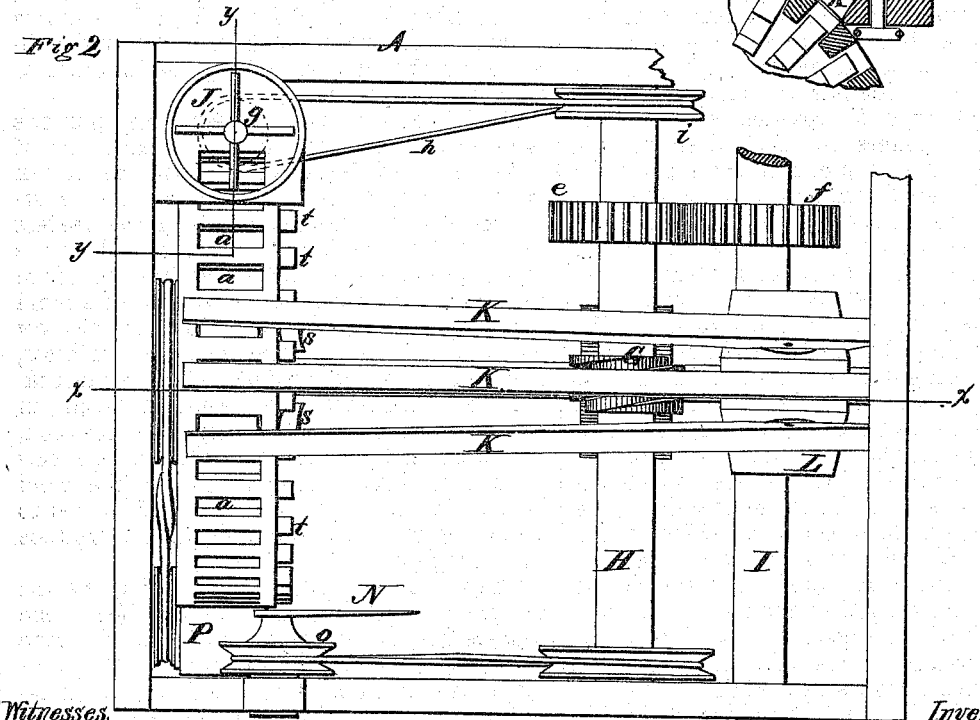
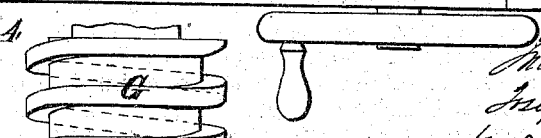

126,728

UNITED STATES PATENT OFFICE.

JOHN N. McLEAN AND JOSEPH BENNOR, OF PHILADELPHIA, PENNSYLVANIA.

IMPROVEMENT IN BRICK-MACHINES.

Specification forming part of Letters Patent No. 126,728, dated May 14, 1872.

SPECIFICATION.

*To all whom may it concern:*

Be it known that we, JNO. N. McLEAN and JOSEPH BENNOR, of Philadelphia, in the county of Philadelphia and State of Pennsylvania, have invented certain Improvements in Machinery for Making Brick, of which the following is a specification, reference being had to the accompanying drawing.

Our invention relates to that class of brick-machines in which the molds are formed in the edge of a vertical revolving wheel; and it consists in various improvements therein, as hereinafter described.

Figure 1 is a longitudinal vertical section through our machine on the line $x\,x$ of Fig. 2; Fig. 2, a plan view of the machine; Fig. 3, a section on the line $y\,y$ of Fig. 2; and Fig. 4, a view of the worm for turning the mold-wheel.

A represents a strong rectangular frame, and B a horizontal shaft mounted longitudinally therein, and provided on one end with the mold-wheel C, which has the molds $a$ formed in its periphery, and provided with movable bottoms or plungers D. By the side of the mold-wheel there is mounted a rigid head or plate, E, provided with an eccentric flange, $b$, which fits into the recessed side of the mold-wheel, and engages in the inner sides or ends of the movable bottoms or plungers D, so that when the wheel is revolved the bottoms are caused to slide around on the flange $b$. The flange is so shaped that it draws the plungers on the ascending side of the wheel inward, as shown in Fig. 3, so as to leave the molds or cells open to receive the clay, and that it forces the plungers on the descending side of the wheel outward flush with the face, so as to deliver the bricks from the molds or cells. The shaft B of the mold-wheel is provided with a spur-wheel F, and operated by means of a worm, G, which is mounted on a transverse shaft, H, and arranged to engage in the spur-wheel, as shown in Figs. 1 and 2. The worm G has its threads on one side made straight, or at right angles to its axis, so that while this straight portion is in action the mold-wheel is allowed to stand still. In this way the mold-wheel is given an intermittent motion while the worm which drives it revolves continuously and at a uniform speed. The worm-shaft H is provided with a pinion, $e$, and operated by a pinion, $f$, on a second transverse shaft, I, to which latter the power for driving the machine is applied. Against the upper right-hand side of the mold-wheel there is mounted a pug-mill, J, for the purpose of mixing and tempering the clay and feeding it into the molds, the mill being provided with the usual shaft and arms, operated by a pulley, $g$, driven by a belt, $h$, from a pulley, $i$, on the worm-shaft, as shown. The pug-mill is provided with a single outlet, $k$, which is made of a size to correspond with the molds or cells which are successively brought under it. To the back end of the frame there are pivoted three arms or levers, K, which extend forward and have weights or beaters on their free ends to fall upon and pack the clay in the molds or cells after they have been filled by the pug-mill. The arms are raised and then allowed to drop by a cam, L, mounted on the driving-shaft I, as shown in Fig. 1, the arms being provided with rollers $m$ for the cam to act against in order to reduce the friction.

Each beater, it will be seen, acts upon one mold or cell at a time, so that at each turn of the cam a blow is delivered upon the clay in three molds or cells. The parts are so arranged that between each fall of the beaters and the next the mold-wheel is turned by the worm a distance equal to that from center to center of the molds or cells, so that a mold which comes under the first beater at one blow will be under the second beater at the next blow, and then under the third beater at the succeeding blow. Thus it will be seen that the clay in each mold receives three blows in succession, one from each beater or hammer. In this manner the clay is compacted into the mold in a solid homogeneous mass, and caused to fill all the corners and angles so as to produce a perfect brick.

The worm is so adjusted that it stops the movement of the mold-wheel just before the beaters fall, so that they will be sure to strike at the proper point. This result is also insured by providing each of the beaters with a depending arm, $s$, and the mold-wheel with studs $t$, so that when the beaters fall their arms will pass between the studs and guide them so as to strike directly over the faces of the molds. On the opposite side of the mold-wheel from the pug-mill there is mounted a rotating blade or arm, N, the shaft of which is provided with a pulley, o, driven by a belt from a pulley on the worm-shaft, as shown in Fig. 2. Each time that the mold-wheel stops the blade N sweeps across the face of one of the molds or cells, and produces a flat smooth outer face to the clay or brick therein. In order that the blade may thus form a perfectly-flat face, the face of the mold-wheel, instead of being curved, is flattened around each mold or cell so as to be parallel with the bottom of the mold, as shown in Fig. 3. By thus flattening the face of the wheel the blade is allowed to form the brick with a perfectly-flat front parallel with its back, so that the brick is of uniform thickness throughout. Under the mold-wheel, in contact therewith, there is mounted an endless apron, P, for the purpose of carrying off the brick as they are delivered from the machine. The apron is driven by a pulley on one of its supporting rollers, which pulley is driven by a belt from a pulley on the shaft B of the mold-wheel, so that the belt or apron is given an intermittent motion corresponding with that of the mold-wheel.

The machine, thus constructed, being set in motion, and its pug-mill filled with clay, it operates as follows: The mold-wheel revolves until one of the molds or cells is brought under the mouth of the pug-mill, and then stops until the mold is filled, when it moves forward so as to bring the next empty mold under the mouth of the mill. Each time the mold-wheel stops the hammers or beaters are raised and allowed to fall on the molds already filled, so as to pack the clay down therein. As the motion of the wheel continues the molds are carried from under the beaters to the blade N, which smooths the outer faces of the bricks or clay, after which the plungers or bottoms are forced outward by the flange b, and the bricks delivered from the molds onto the endless apron, and by it carried off.

Having thus described our machine, what we claim as our invention is—

1. The combination, with a mold-wheel, of the shaft I, cam L, and pivoted levers or hammers K, constructed and arranged to operate as and for the purpose set forth.

2. The combination of the mold-wheel C and movable bottoms D with the flange b upon the stationary head E, constructed and arranged to operate substantially as and for the purpose set forth.

3. In combination with the spur-wheel F, shaft B, mold-wheel C, and endless apron P, we claim the irregularly-curved worm G, constructed and arranged to operate substantially as described, for the purpose of giving a simultaneous intermittent motion to the mold-wheel and apron, as set forth.

4. The combination of the mold-wheel C, irregularly-curved worm G, and the pivoted hammers K, when constructed and arranged to operate substantially as and for the purpose of giving an intermittent motion to the mold-wheel, for receiving the blows of the hammers successively on the brick in the molds, as set forth.

5. In combination with the mold-wheel C, having square surfaces about the molds, the revolving knife N, constructed and arranged to operate substantially as and for the purpose set forth.

6. The combination of the pug-mill J, mold-wheel C, stationary head E, endless apron P, revolving-knife N, and pivoted hammers K, with the irregularly-curved worm G and the intervening mechanism, when constructed and arranged to operate substantially as and for the purpose set forth.

JNO. N. McLEAN.
JOSEPH BENNOR.

Witnesses:
ROBERT R. SMITH,
THOMAS B. MYERLE.